(12) United States Patent
Photos et al.

(10) Patent No.: US 12,458,940 B2
(45) Date of Patent: Nov. 4, 2025

(54) CO-CURRENT AND COUNTERCURRENT CONTACTOR FOR IMMISCIBLE FLUIDS

(71) Applicant: Streamline Innovations, Inc., San Antonio, TX (US)

(72) Inventors: Peter J. Photos, Boerne, TX (US); Franklin Hailey Brown, II, San Antonio, TX (US); John Bourdon, Peculiar, MO (US); Trey Taylor, Belton, TX (US)

(73) Assignee: Streamline Innovations, Inc., San Antonio, TX (US)

( * ) Notice: Subject to any disclaimer, the term of this patent is extended or adjusted under 35 U.S.C. 154(b) by 868 days.

(21) Appl. No.: 17/552,727

(22) Filed: Dec. 16, 2021

(65) Prior Publication Data

US 2023/0330607 A1    Oct. 19, 2023

(51) Int. Cl.
*B01F 25/421*    (2022.01)
*B01F 23/21*     (2022.01)
*B01F 23/232*    (2022.01)
*B01F 35/00*     (2022.01)
*B01D 53/52*     (2006.01)
*B01D 53/78*     (2006.01)
(Continued)

(52) U.S. Cl.
CPC ........ *B01F 25/4232* (2022.01); *B01F 23/214* (2022.01); *B01F 23/2321* (2022.01); *B01F 23/2322* (2022.01); *B01F 35/165* (2022.01); *B01D 53/52* (2013.01); *B01D 53/78* (2013.01); *B01D 2251/90* (2013.01); *B01F 2025/918* (2022.01); *B01F 2101/2204* (2022.01)

(58) Field of Classification Search
CPC ......... B01F 25/4232; B01F 23/2322; B01F 23/214; B01F 23/2321; B01F 2025/918
See application file for complete search history.

(56) References Cited

U.S. PATENT DOCUMENTS 2,047,989 A * 7/1936 Woelflin ............ B01D 17/06
210/260
5,543,043 A    8/1996 Bates et al.
(Continued)

OTHER PUBLICATIONS

Mar. 22, 2023 International Search Report Issued in PCT/US2022/052940.
(Continued)

*Primary Examiner* — Marc C Howell
(74) *Attorney, Agent, or Firm* — Jayne Saydah (57) ABSTRACT

A multi-directional contactor apparatus configured to utilize co-current and counter current flow to contact a first fluid and a second fluid, wherein the second fluid is more dense than the first fluid. The contactor comprises a chamber partially divided by a vertically extending weir, a first inlet port permitting the first fluid to enter the chamber, a second inlet port positioned above the first inlet port and permitting the second fluid to enter the chamber. Countercurrent and co-current contact of the first and second liquids occurs on one side of the weir. The weir separates the co-current contacted second fluid stream from the countercurrent contacted second fluid stream and allows the separated streams to be released from the chamber. The co-current and countercurrent contacted first fluid is released from an upper portion of the tank.

19 Claims, 8 Drawing Sheets

(51) Int. Cl.
   *B01F 25/00*     (2022.01)
   *B01F 101/00*    (2022.01)

(56) References Cited

U.S. PATENT DOCUMENTS

| | | |
|---|---|---|
| 2005/0132883 A1* | 6/2005 | Su .......................... C10K 3/04 423/220 |
| 2009/0166255 A1 | 7/2009 | Halsey |
| 2012/0103193 A1 | 5/2012 | Polderman |
| 2015/0190744 A1 | 7/2015 | Grave et al. |
| 2020/0346140 A1 | 11/2020 | Soares Da Silva et al. |

OTHER PUBLICATIONS

Mar. 22, 2023 Written Opinion Issued in PCT/US2022/052940.
Jun. 13, 2024 International Preliminary Report on Patentability Issued in PCT/US2022/052940.

* cited by examiner

CO-CURRENT AND COUNTERCURRENT CONTACTOR FOR IMMISCIBLE FLUIDS

BACKGROUND OF THE INVENTION

1. Field of the Invention

The present invention relates to a contactor for two fluids including differing properties. More specifically, it relates to a contactor utilizing co-current and countercurrent flow for contacting fluids.

2. Description of the Related Art

Contactors are chemical process units that may allow heat and mass transfer between fluids of immiscible fluids. Fluids having differing properties may be passed through a contactor to allow reactions between the fluids that otherwise would not sufficiently occur to meet process goals. For example, when two fluids of differing densities, such as a gas and a liquid, are placed in a vessel, rather than mix, the fluids would stratify based on density and only a limited reaction may occur.

Conventional contactors utilize either countercurrent or co-current flow. A bubble tower contactor is an example of a counter-current flow contactor. Two fluids are allowed to enter the chamber of a contactor. The less dense fluid, which is often a gas, enters from a point of lower elevation than the relatively denser fluid which is often a liquid. The gas, for example, bubbles through the liquid and exits from the top of the chamber while the liquid exits the bottom of the chamber.

In a co-current contactor two fluids enter a chamber and flow in the same direction as the fluids are contacted and ultimately exit the chamber. In this case, the two fluids may travel along the same direction as they move laterally or vertically through a tank.

The use of a co-current only and/or a countercurrent contactor have many inefficiencies. Although each may allow two immiscible fluids to contact each other, the contact time and/or quality of the contact may not be great enough for an effective treatment or chemical reaction between the fluids to occur. Overcoming this problem requires incurring additional expenses and process steps through the addition of catalysts, increasing and decreasing chamber pressure, thermal energy and building larger contact chambers, etc.

Therefore, there is a need for a contactor that overcomes the inefficiencies of the co-current and countercurrent contactors.

BRIEF SUMMARY OF THE INVENTION

The invention according to this disclosure relates to a co-current and counter contactor for contacting immiscible or varied density fluids. The contactor may utilize an internal weir, which divides the contactor into sections, to effect countercurrent and co-current contact of two liquids within the same contactor. The simultaneous countercurrent and co-current contacting is advantageous in overcoming the inefficiencies of the solely countercurrent or co-current contactors.

One aspect of the invention, according to this disclosure, is a contactor configured to contact a first fluid and a second fluid, wherein the second fluid includes a greater density than the first fluid. The contactor includes a tubular chamber defined by a chamber wall, and the chamber extending vertically a first height. The chamber wall includes first and second inlet ports which are configured to allow the first fluid and second fluids to enter the chamber, and the chamber wall includes first, second and third outlet ports. A weir is connected to an interior surface of the chamber wall. The second inlet port is positioned, in the chamber wall, above the first inlet port. The first outlet port being above the first inlet port, and the first outlet port configured to allow a countercurrent and a co-current contacted first fluid to be released from the chamber. The second outlet port being below the second inlet port. The second outlet port configured to release a first portion of a contacted second fluid from the chamber, and the first portion of contacted second fluid being a countercurrent contact stream. The third outlet port being laterally spaced apart from the second outlet port; the third outlet port configured to release a second portion of the contacted second liquid from the chamber; and the second portion of the contacted second liquid being a co-current contact stream. The weir extends vertically a second height which is less than the first height such that the weir partially divides the chamber into a first chamber section and a second chamber section. The first chamber section including the first inlet port and second outlet port for releasing the countercurrent contact stream, and the second chamber section including the third outlet port for releasing the co-current contact stream.

In another aspect of the invention, the second outlet port is configured with an effluent flow rate; the second inlet port is configured with an influent flow rate; and the effluent flow rate is less than the influent flowrate.

In another aspect of the invention, the weir further includes a first weir surface opposite a second weir surface with the first weir surface facing the second outlet port, the first inlet port and a first portion of the chamber wall; and a second weir surface facing a second portion of the chamber wall and the third outlet positioned in the second portion of the chamber wall.

In another aspect of the invention, the chamber includes a first chamber section laterally adjacent a second chamber section, and the weir is positioned therebetween.

In another aspect of the invention, the weir further includes an impervious barrier between the first and second chamber sections.

In another aspect of the invention, a distribution element is connected to the first inlet, the distribution element extending laterally from the first inlet towards the weir, and the distribution element configured to release the first fluid within the chamber.

In another aspect of the invention, the weir further includes a substantially vertically extending plate including a first end and a second end extending between two sides. The second end and two sides are connected to the interior surface of the vessel such that the first end is relatively higher than the second end, wherein the first end is configured to allow the contacted second fluid to flow over the weir.

In another aspect of the invention, the first chamber section is configured to allow simultaneous countercurrent and co-current contact between the first fluid and second fluid. The first portion of the contacted second fluid released by the second outlet results from countercurrent contact flow between the first and second fluids, and the contacted second fluid, released from the third outlet, results from co-current flow of the second and first fluids and the second fluid flowing over the weir.

In another aspect of the invention, the first chamber section is configured to allow the first fluid to flow in a first direction, which is substantially upwardly, between the first inlet port and the first outlet port; and the first chamber section is configured to allow the second fluid to flow in a second direction, which is substantially downwardly, between the second inlet port and the second outlet port; and the chamber is configured to simultaneously allow the second fluid to flow in the first direction and second direction as the second fluid flows from the second inlet port, over the weir and is released from the third outlet port.

In another aspect of the invention, the first and second fluids comprise a gas, liquid, solid, vapor or combination thereof.

In another aspect of the invention, a co-current contact section is within the chamber and disposed above the weir.

Another aspect of the invention, according to this disclosure, relates to a method of making a co-current and countercurrent contactor apparatus configured to contact a first fluid and a second fluid, wherein the second fluid has a greater density than the first fluid. The method includes the following steps: forming a chamber enclosed by a chamber wall including an interior surface defining the chamber, and the chamber including a first vertically extending height; forming a first inlet port in the chamber wall, the first inlet port configured to allow the first fluid to enter the chamber; forming a second inlet port in the chamber wall, the second inlet port being above the first inlet port, and the second inlet port configured to allow the second fluid to enter the chamber; forming a first outlet port in the chamber wall, the first outlet port being above the first inlet port, and the first outlet port configured to allow a countercurrent and co-current contacted first fluid to be released from the chamber; forming a second outlet port in the chamber wall, the second outlet port being below the second inlet port, and the second outlet port configured to release a first portion of contacted second fluid from the chamber, the first portion of contacted second fluid being a countercurrent contact stream; forming a third outlet port in the chamber wall such that the third outlet port is laterally spaced apart from the second outlet port, and the third outlet port configured to release a second portion of the contacted second liquid from the chamber, the second portion of the contacted second liquid being a co-current contact stream; and placing a weir in the chamber such that the weir extends vertically a second height which is less than the first height and the weir partially divides the chamber into a first chamber section and a second chamber section, the first chamber section including the first inlet port and second outlet port for releasing the countercurrent contact stream and the second chamber section including the third outlet port for releasing the co-current contact stream.

In another aspect of the invention, the step of placing the weir in the chamber includes the step of connecting the weir to an interior surface of the chamber wall such that the weir abuts the interior surface of the chamber wall between the second outlet port and the third outlet port, and a second end of the weir is lower than the than a first end of the weir.

In another aspect of the invention, the step of placing the weir in the chamber includes placing the weir in the chamber such that a first surface of the weir faces the first inlet port and the second outlet port, and a second surface of the weir faces the third outlet port; and forming a fluid impervious barrier where the weir abuts the interior surface of the chamber wall.

Another aspect of the invention, according to this disclosure, relates to a method of co-current and countercurrent contacting of a first fluid with a second fluid, wherein the second fluid includes a greater density than the first fluid. The method includes the following steps of generating a combined co-current and countercurrent contact fluid, including contacted first and second fluids, concurrently delivering the first and second fluids into a chamber, wherein the step of generating combined co-current and countercurrent contact fluid includes generating countercurrent contact between the first and second fluids by allowing the first fluid to flow into the chamber through a first inlet port in the chamber wall and flow upwardly within the chamber, and allowing the second fluid flow into the chamber through a second inlet port positioned in the chamber wall above the first fluid inlet port and allowing the second fluid to flow downwardly contacting the upwardly flowing first fluid, and generating co-current contact between the first and second fluids by allowing the first and second fluids to contact while flowing upwardly against a weir disposed vertically within the chamber.

In another aspect of the invention, the method includes the step of separating a co-current contacted second fluid stream from the combined co-current and countercurrent contact fluid by allowing a co-current portion of the combined co-current and countercurrent contact fluid to flow over the weir and out of the chamber via a co-current outlet port.

In another aspect of the invention, the method includes the step of separating a countercurrent contacted second fluid stream from the combined co-current and countercurrent contact fluid by releasing a countercurrent portion of combined co-current and countercurrent contact fluid from a countercurrent outlet port, the countercurrent outlet port being laterally adjacent the co-current outlet port and the co-current and countercurrent outlet ports being separated by the weir.

In another aspect of the invention, the method includes the step of separating a co-current and countercurrent contacted first fluid stream from the combined co-current and countercurrent contact fluid by releasing the upwardly flowing contacted first fluid from a first fluid outlet port position on a portion of the chamber wall above the first inlet fluid.

In another aspect of the invention, the first and second fluids comprise a gas, liquid, solid, vapor or combination thereof.

In another aspect of the invention, the step of generating countercurrent contact between the first and second fluids includes allowing the second fluid flow into the chamber through a second inlet port at a first flow rate, and releasing the countercurrent contacted second fluid via the countercurrent contact outlet port at a second flowrate which is less than the first flowrate.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Also, as used herein, the words "connected" or "coupled" are each intended to include integrally formed members, direct connections between two distinct members without any other members interposed therebetween and indirect connections between members in which one or more other members are interposed therebetween. The terminology includes the words specifically mentioned above, derivatives thereof, and words of similar import.

As used herein, the words "bi-directional" and "multi-directional" refer to contact between two fluids which may occur in at least the countercurrent and co-current directions. The word "bi-directional" is not limited to only countercurrent and co-current contact but may incorporate multiple types of contact and multiple stages of contact.

Referring now to the drawings in detail, wherein like numbers are used to indicate like elements throughout, there is shown, in FIGS. 1A-3, embodiments of a bi-directional contactor 50 configured to simultaneously contact fluids in the co-current and countercurrent direction. The bi-directional contactor 50 may be used to contact immiscible fluids including liquids, gases, and solids (i.e., fluidized beds). For example, the contacting fluids may be a gas and a liquid that are placed in the contactor for various reasons such as reactive processes, mechanical mixing and/or thermal treatment. The preferred embodiment of the contactor 50 comprises an interior chamber 40, a weir 20, first fluid inlet port 1, second fluid inlet port 8, first fluid effluent port 4, second fluid effluent ports 2 and 3.

The contactor 50 includes a tubular, tank or chamber 40 having a centerline C and chamber wall 10. The chamber 40 extends laterally within the chamber wall 10 and longitudinally a first height H1. Chamber 40 may be impervious to fluids and/or fluid tight except for ports 1, 2, 3, 4 and 8. A closed tank, vertical, cylindrical column contactor 50 with a tubular, annular chamber wall 10 is shown in this embodiment. However, it is contemplated that the contactor 50 may include chamber wall 10 that defines other forms such as a cube, cuboid, prism, or sphere. Additionally, chamber 40 may be on open tank rather than a closed tank. Further, the cylindrical column may correspond to different types of contacting such as a bubble contactor and/or packed tower.

The chamber wall 10 includes a sidewall 11, lower end wall 12, upper end wall 13. The sidewall 11 is tubular and may be annular, a hollow cylinder or sphere, and/or other polygonal shape. The end walls 12 and 13 are connected to each of the ends of the sidewall 11. The chamber wall 10 may be formed of a material that is strong enough to contain the fluids and non-reactive with the materials to be placed in the contactor 50. Depending on the application, some suitable materials for forming the chamber wall 10 may include metallic compounds such as stainless steel, plastics and other polymers, composites, and ceramics, etc. Additionally, the chamber wall 10 may be of one-piece construction or formed by connecting separate sections such as side all 11, upper end wall 13 and lower end surface 12 through methods known in the art such as welding and bonding.

The tank or chamber 40 includes a first inlet port 1 in the chamber wall 10. First inlet port 1 is positioned at relatively low elevation and adjacent the interior wall lower surface 12. The first inlet port 1 is configured to allow a first fluid 74 to enter the chamber 40 at a first influent volumetric flow rate. Among the fluids to be contacted, the first fluid may be a gas, liquid, vapor or solid, or combination thereof, etc. in need of treatment or utilized to impart treatment via contacting a second fluid 72 having the relatively higher density.

On the interior of the chamber 40, the first inlet port 1 may include a fluid or gas distribution element 15 that assists in distributing the first fluid 74 across the chamber 40. The distribution element 15 may connected to the first inlet port 1 and include a bubbler, diffuser or other suitable element known in the art.

A second inlet port 8 is positioned above the first inlet port 1 and is configured to allow a second fluid 72 to enter the chamber 40 at a second influent volumetric flow rate. The second fluid 72 may be a relatively denser than the first fluid 74. That is the second fluid 72 may include relatively more dense gas, liquid, solid, vapor, or combination thereof, etc. required for treatment, via contacting, of the less dense first liquid 74. As a result, when the first fluid 74 enters the chamber, the first fluid 74 flows upwardly and contacts the second fluid 72 while the second fluid 72 flows downwardly. For example, if the first fluid 74 is a gas and the second fluid 72 is a liquid, the gas would upwardly permeate and contact the liquid as the liquid flows downwardly from an upper portion of the tank to a lower portion of the chamber 40.

Figure 1A:
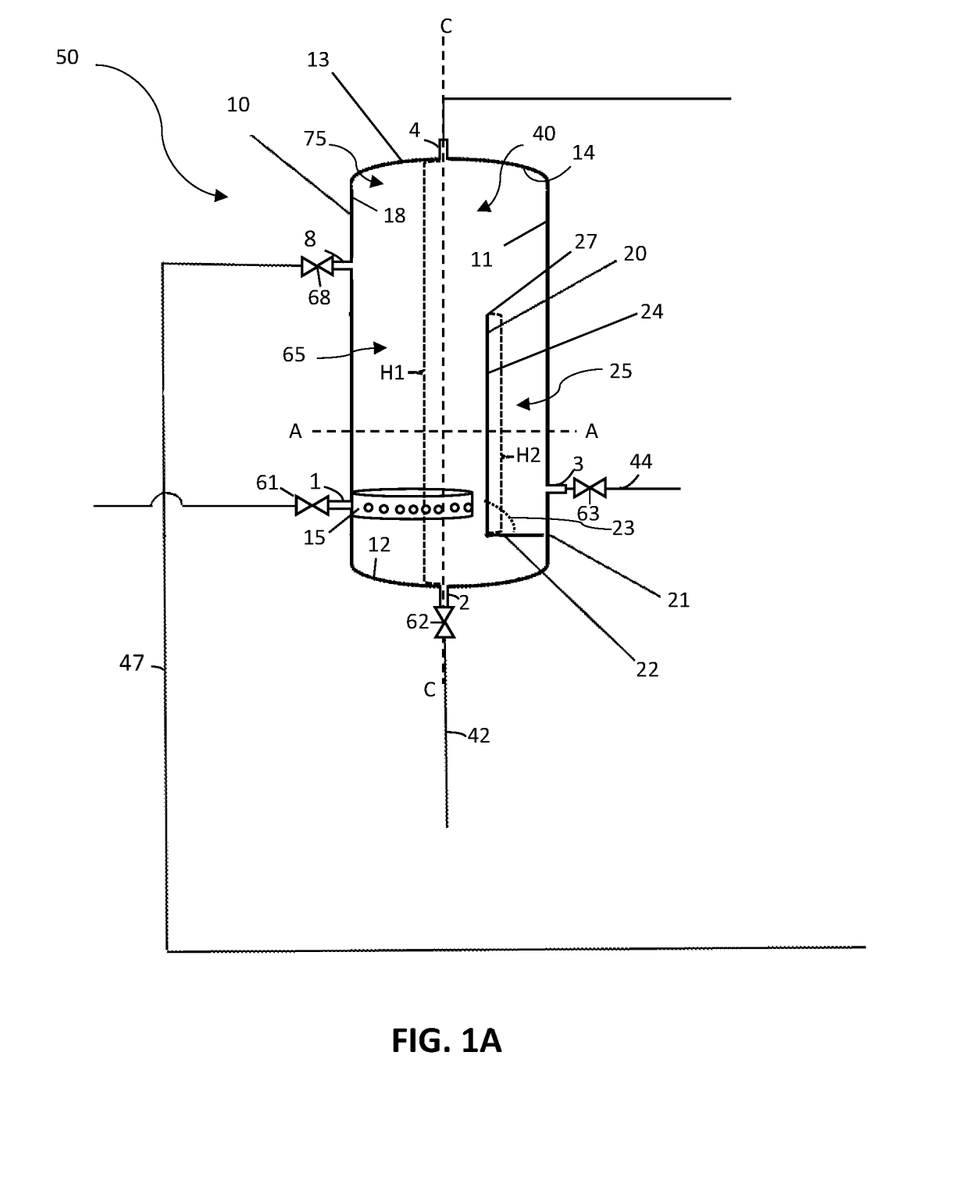
FIG. 1A is a side view of a first embodiment of a bi-directional contactor according this disclosure.
Figure 1B:
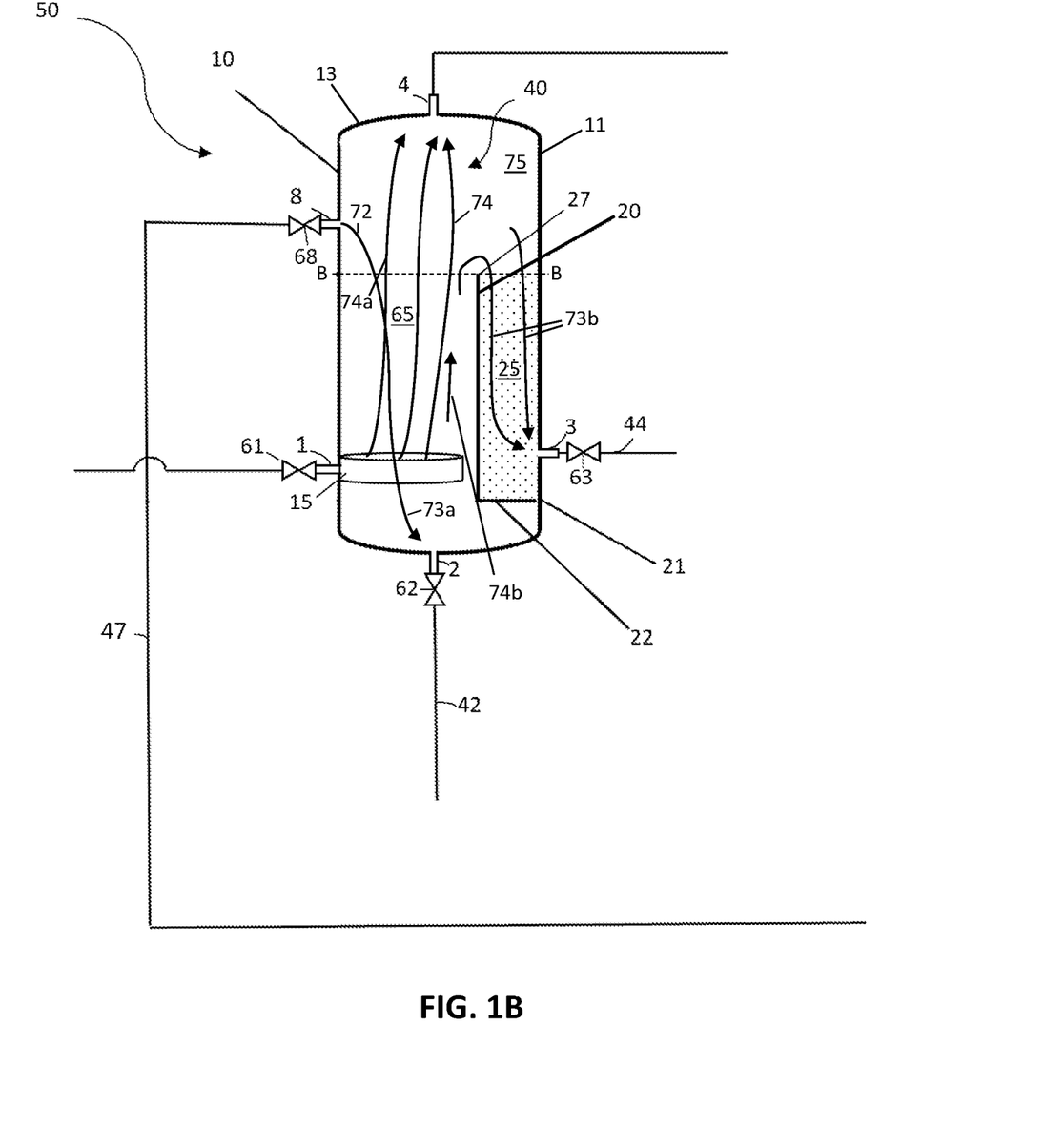
FIG. 1B is a side view of the embodiment of the contactor in FIG. 1A depicting exemplary bi-directional fluid flow.
Figure 4:
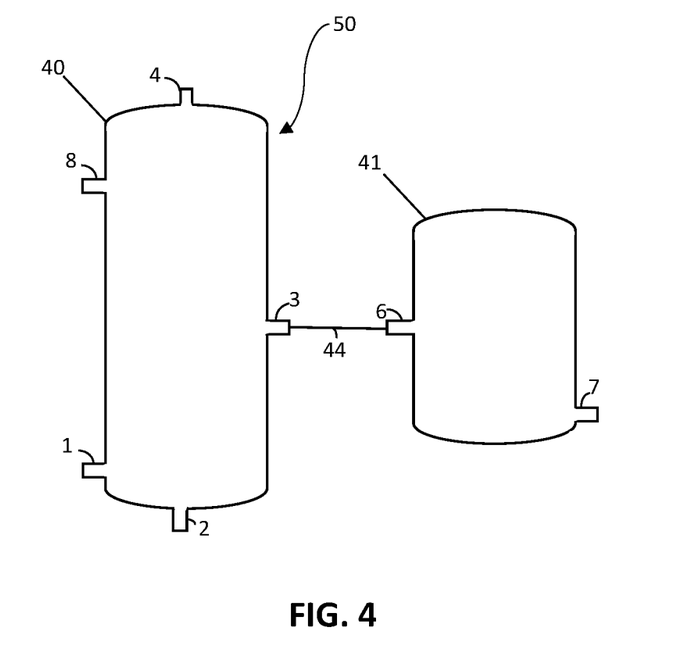
FIG. 4 is a second embodiment of the contactor according to this disclosure.

The chamber wall 10 includes a first effluent/outlet port 4 configured to release the contacted, treated, separated, purified and/or otherwise processed first fluid 74 from the contactor 50. The first effluent port 4 is located above the first inlet port 1 and may be located at an upper portion of the chamber 40 and above second fluid inlet port 2. The relatively higher position of the first effluent port 4 allows the first fluid to rise vertically through a height of the second fluid and the first height H1 of chamber 40 and then, exit the chamber 40. Although FIGS. 1A, 1B and 4 show the effluent port 4 extending through the center and upper most portion of the chamber wall 10, the effluent port 4 may be located on other areas of the chamber wall 10 such as different locations on upper wall surface 13 and portions of the side wall 11 above the first fluid inlet port 1. Further, chamber 40 is shown as a closed, but it is contemplated that the chamber 4 may be an open chamber with first outlet port 4 extending across the width of the chamber.

The chamber wall 10 also includes second and third effluent/outlet ports 2 and 3, respectively, which are configured to release the contacted and/or reacted fluid 75 from the chamber 40. The contacted fluid 75 may, if desired, be reactivated or regenerated and input into chamber 40 via port 8. As shown in FIGS. 1A-5, the second and third effluent ports 2 and 3, respectively, may be laterally spaced apart from each other and from inlet ports 1 and 8. Also, as shown in FIGS. 1A, 1B, 2, 4 and 5, the third effluent port 3 may be at a relatively higher elevation on the chamber wall 10 than the second effluent port 2. Other configurations are envisioned. As shown in FIG. 3, effluents ports 2 and 3 may be at the same or similar elevations.

The second effluent port 2 may be configured with a second effluent volumetric flowrate, and the third effluent port 3 is configured with a third effluent volumetric flow rate. The second and third effluent volumetric flow rates have a direct correlation to the type of contacting flow inside the chamber 40. When the second effluent volumetric flow rate is less than the first influent volumetric flow rate, the chamber 40 is configured for both co-current and counter-current flow. In this configuration, the second fluid 72 flows in both the downwardly and upwardly directions creating two contacted fluid streams 73a and 73b. The portion of the second fluid 72 exiting through the second effluent port 2 is contacted second fluid 73a that moved substantially downwardly and therefore, in the opposite or countercurrent direction as the first fluid 74 flows upwardly through the chamber 40. Contacted second fluid stream 73b may include a portion of the contacted second fluid 72 that does not exit through port 2 but instead, may flow upwardly against and/or over the weir 20 in substantially the same direction or co-current as the first fluid 74 flows through the chamber 40. In other words, contacted fluid 73a represents first and second fluid countercurrent contact flow, but contacted fluid 73b represents first and second fluid co-current contact flow.

The chamber 40 may be constructed with inlet ports 1, 8 and outlet ports 2, 3 having the appropriate diameters to establish co-current and countercurrent flow. Alternatively, valves 62 and 63, respectively, may be placed on the ports 2, 3 so that the second and third effluent volumetric flow rates may be adjusted for simultaneous co-current and countercurrent flow. Additionally, valves 61 and 68 may be placed on the first and second inlet ports 1 and 8, respectively. Valves 61 and 68 may be used to control the first and second influent volumetric flow rates.

In the preferred embodiment, a weir 20 is disposed in the chamber 40 and connected to the chamber wall 10. As shown in FIG. 1, the weir 20 includes a substantially vertically extending member 24 spaced apart from the side wall 11 and connected at an angle 23 to a substantially horizontally or laterally, with respect to centerline C, extending member 22. The angle 23 is generally a right angle, but it is envisioned that this angle may also be greater than or less than 90 degrees as long as the member 24 extends in a vertical or longitudinal direction and is spaced apart from the sidewall surface. Also, section 22 may extend both vertically and horizontally as long as section 22 is able to extend far enough towards the centerline C to provide a space 25 between the weir 20 and interior side wall surface 11.

The weir 20 may be formed of one-piece plate or sheet having an L-shaped cross section from materials suitable for the specific application. For example, depending upon the reactivity of the first and second fluids 74, 72 the weir 20 may be formed of a three-dimensionally stable material such as fiber glass, plastic or other polymeric moldable material, ceramic, wood, and/or a metallic compound such as stainless steel, etc. Also, separate plates or sheets may be used as members 22 and 24 and the L-shape may be formed by bonding or welding the members 22 and 24 together.

The weir 20 is configured such that member 24 has a second height H2 which is relatively less than the first height H1 of the chamber. As a result, the weir 20 partially divides the chamber 40 and forms a space or second chamber section 25 separate, except for the opening at the top, from the remainder of the chamber 40. Also, the weir 20 may form a fluid impervious barrier between the second and third effluent ports 2 and 3. Once a fluid flows over the weir edge 27 and enters second chamber section 25, the fluid is segregated from the other contents of the chamber 40 and flows out effluent port 3. This allows the generation of a separated contacted second fluid that includes a co-current contacted second fluid stream 73b As shown in FIG. 1B, the weir 20 creates three chamber sections including a first chamber section 65, second chamber section 25 and a third chamber section 75. Each chamber section 25, 65, 75 include flow characteristics differing from the other chamber sections 25, 65 and 75. The first chamber section 65 extends laterally from the weir 20 to the chamber sidewall 11 and is laterally adjacent the second chamber section 25. The third chamber section 75 extends laterally above the first chamber 65 and second chamber 25. Line B-B depicts a boundary between the lower portion of the third chamber section 75 and the upper portions of the first and second chamber sections 65 and 25, respectively. The third chamber section 75 permits fluid communication between the first and second chamber sections 65 and 25.

Figure 5:
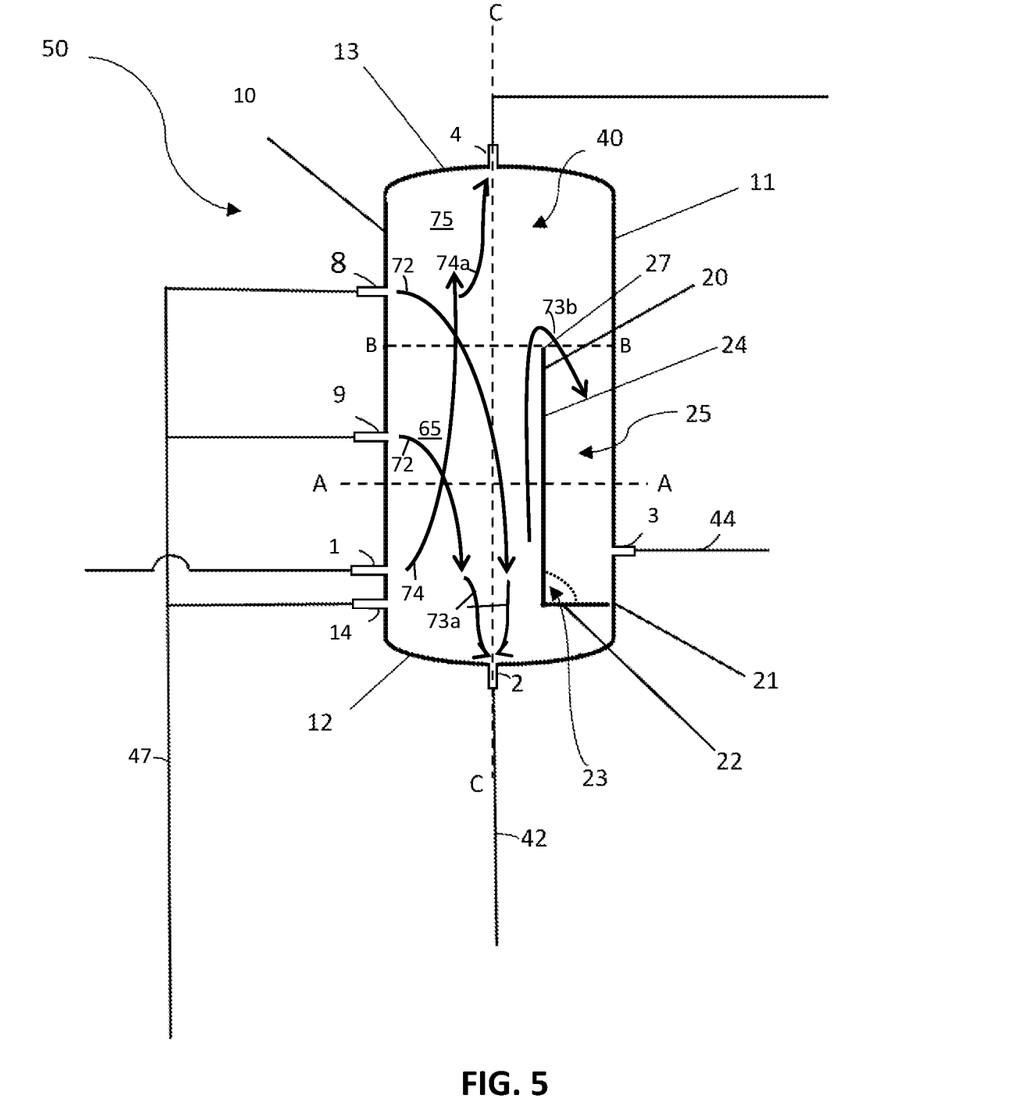
FIG. 5 is a third embodiment of the contactor of this invention to contact two fluids.

As shown in FIGS. 1B and 5, the third chamber section 75 may extend across the entire diameter of chamber 40. The sides and upper portion of section 75 may be defined by sidewall 11, and upper end wall 13. The lower portion of section 75 is bounded by dashed plane B-B which extends across the chamber 40 and is contiguous with edge 27 of weir 20.

Section 25 may be fluid tight on the sides and bottom such that the weir 20 forms an impervious barrier between the second effluent port 2 and third effluent port 3. The weir 20 permits contacted second fluid 73 to cross into the second chamber section 25 by flowing over the top edge 27 of the weir 20. When the second chamber section 25 is completely sealed from the chamber 40, the contacted fluid 73 exits the chamber via ports 2 and 3.

Figure 2:
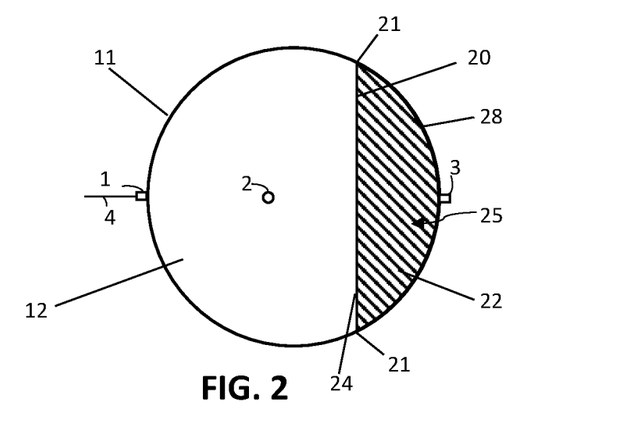
FIG. 2 is plan view of a cross section along line A-A of the embodiment of FIG. 1.
Figure 3:
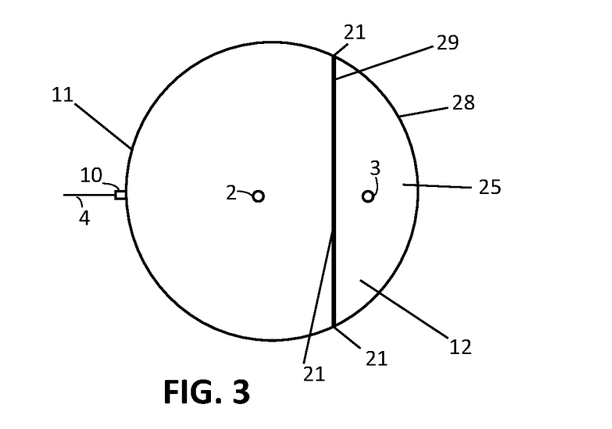
FIG. 3 is a plan view of a cross section along line A-A of the embodiment of a contactor according to this disclosure.

Second chamber section 25, as depicted in FIGS. 1A, 1B and 2, is bounded by member 24, sidewall surface 11, and lower side member 22. The side edges of members 22 and 24 are coupled to sidewall 11 through connection 21 which extends contiguously around the edges of members 22 and 24 that abut the sidewall surface 11. The connection 21 may be formed through a suitable fluid tight or fluid impervious method such as bonding or welding. Alternatively, the entire contactor 50 with the weir 20 attached internally may be formed from one-piece construction such as by molding or additive manufacturing.

The weir 20 may be a variety of heights. In the preferred embodiment, the weir 20 has a second height H2 that extends through the majority of the height of chamber 40. However, the weir height may be altered to accommodate desired heights of co-current flow. For example, the greater the weir 20 height, the greater the length of the co-current flow within the chamber 40.

When using an internal weir 20, the third effluent port 3 is positioned such that it may release the contacted fluid 73 from within the section 25 to the outside of the chamber 40. For this to occur port 3, must positioned on a portion of the internal side wall 18 that defines section 25 and is facing or adjacent weir 20. Essentially, port 3 must be within section 25. In FIGS. 1A and 1B, port 3 is positioned at a relatively lower portion of sidewall surface 11, but it is noted that port 3 may be placed at different elevations within the height H2 of the weir 20.

The weir 20 may take various forms. For example, a second embodiment of a weir 29 according to this disclosure is shown in FIG. 3 which is a plan view of a cross section along line A-A of FIG. 1A. The weir 29 does not include members 22 and 24, rather weir 29 is a single member or plate that is connected directly to the side wall surface 11 and lower wall surface 12. Connection 21 is contiguous around the sides and bottom of the weir 29. Connection 21 is formed where the sides of the weir 29 abut the side wall surface 11 and lower wall surface 12. When weir 29 is used, the effluent port 3 may be on the sidewall surface 11 as shown in FIG. 1 or on the lower wall 12 as shown in FIG. 3.

Other embodiments of the weir 20 are also contemplated. For example, although not shown, the weir 20 may also be a standpipe or tubular member surrounding an internal space 25 and an effluent port 4 within the tubular member.

Another embodiment of the invention is shown in FIG. 4. Rather than having a weir 20, 29 inside the chamber 40, a second tank 41 is connected to chamber 40. Rather than flow over the top edge 27 of weir 20, the second contacted fluid flows out of chamber 40 via port 3, through line 44, port 6 and into chamber 41 from which it exits via port 7. In other words, chamber 41 functions like the external chamber as compared to internal weirs 20, 29 which create sections 25.

Although the embodiment of the invention in FIG. 1 depicts one second fluid influent port 8 connected to line 47, multiple second fluid influent ports at differing elevations may be utilized. FIG. 5, for example, depicts another embodiment of the invention. As shown, an additional second fluid influent port 9 is positioned between ports 8 and 1. Additionally, a second fluid influent port 14 may be positioned at a relatively lower portion of the chamber 40 and lower than the first fluid influent port 1. Ports 9 and 14 are examples of additional second influent ports.

The number and position (i.e., height) of the second fluid inlet ports 8, 9 and 14 may be altered to accommodate the amount of co-current and countercurrent flow. For example, inlet port 8 is positioned higher than either ports 9 or 14, and therefore, port 8 creates a greater amount of countercurrent flow relative to port 1 than either of ports 9 or 14. On the other hand, port 14 is positioned below inlet port 1, so port 14 creates only co-current flow of the second fluid with the first fluid.

Although the contactor 50 is configured for both co-current and countercurrent flow, the contactor 50 may be configured for solely co-current or countercurrent flow. This is done by adjusting the second fluid inlet ports 8, 9, 14 and outlet ports 2, 3 to direct the flow. For example, if inlet ports 8, 9 are open and port 3 is closed, the contactor 50 will be placed in solely countercurrent flow. On the other hand, if port 2 is closed, the contactor 50 is placed in solely co-current flow.

The second fluid inlet ports 8, 9 and 14 may also be configured for co-current or countercurrent flow. For example, if ports 8, 9 are closed and port 14 is open, then the flow within the contactor is substantially co-current flow.

Figure 6:
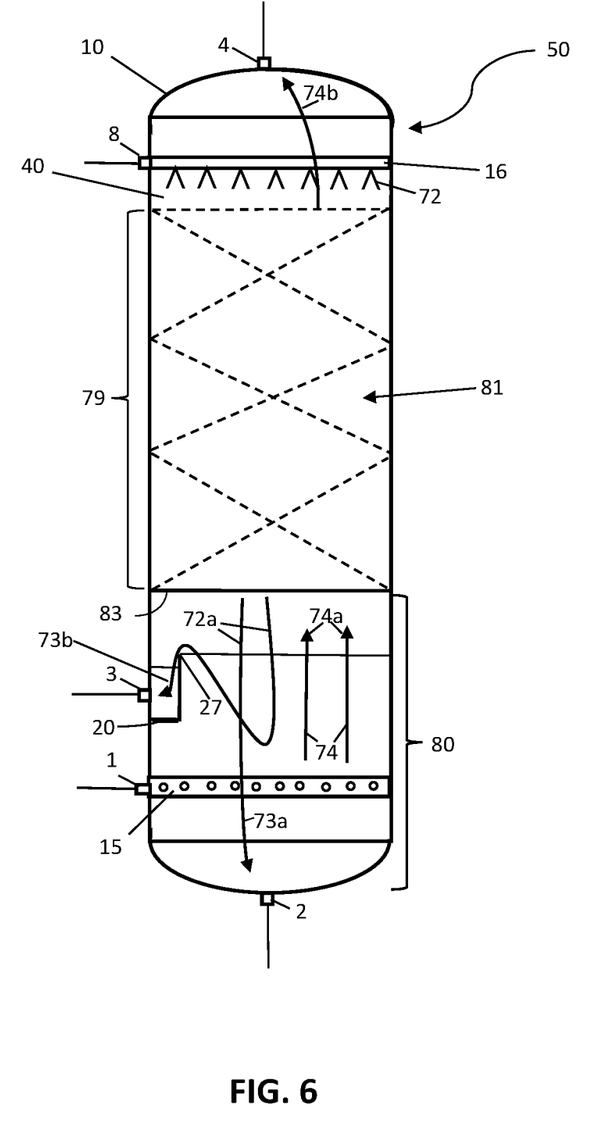
FIG. 6 is a fourth embodiment of a bi-directional contactor including two stage contacting.

FIG. 6 depicts a fourth embodiment of the bi-directional contactor according to this disclosure. In this embodiment, contactor 50 provides for two stages of contact between the first fluid 74 and second fluid 72 and incorporates a countercurrent contacting section 79 with a bi-directional contacting section 80, including a weir 20, positioned below contacting section 79.

The second fluid 72 enters the contactor 50 via port 8 and may be released across the width of the chamber 40 by a fluid flow balancing device 16 such as a spray type or trough, etc. It is noted that device 16 is optional in both the contactor 50 of the first embodiment and the second embodiment.

Simultaneously, the first fluid 74 enters the contactor 50 via port 1 and the distributing element 15.

In this embodiment, it is preferred that port 1 and the distributing element 15 are positioned below the weir 20 as shown. This provides a greater depth of contact between the first and second fluids 74, 72. Alternatively, the distributing element 15 may also be adjacent the vertically extending weir member 24, but the depth of contact will not be as great.

The countercurrent current contact section 79 may include media 81 such as trays and/or random packing, etc. that are supported by support member 83. In this section, second fluid 72 is released from device 16 and trickles or flows down through media 81. Concurrently, contacted first fluid 74a flows up from the bi-directional contacting section 80 through media 81 and contacts the second fluid 72. Since the first fluid 74 is previously contacted in the bi-directional contacting section 80, the first fluid 74a becomes twice contacted second fluid 74b and exits the chamber 40 from port 4.

The bi-directional contacting section 80 receives the contacted second fluid 72a from section 79 as it is released from the media 81. The second fluid 72a may collect in the lower portion of the chamber 40 by setting the effluent flowrate of port 4 to be less than the influent flow rate of port 8. This allows the second fluid 72a to submerse the distributing element 15 and flow over weir 20 and out port 3.

In the bi-directional contacting section 80, the first fluid 74 and contacted second fluid 72a are subject to simultaneous co-current contact and countercurrent contact. Countercurrent contact occurs as the first fluid 74 is released from the distributing element 15 and flows through the downwardly flowing contacted second fluid 72a that is released from section 79. As a result, contacted first fluid 74a may move upwardly through the media 81 of section 80. Concurrently, co-current contact occurs as both the contacted second fluid 72a and the first fluid 74 move upwardly along the vertically extending weir member 24.

The contacted second fluid flow over the weir allows the separation of the countercurrent and co-current contacted second fluid streams 73a and 73b. The co-current contacted second fluid 73b flows over the weir 20 and out port 3. The countercurrent contacted second fluid stream 73a is released from the contactor 50 via port 3.

Figure 7:
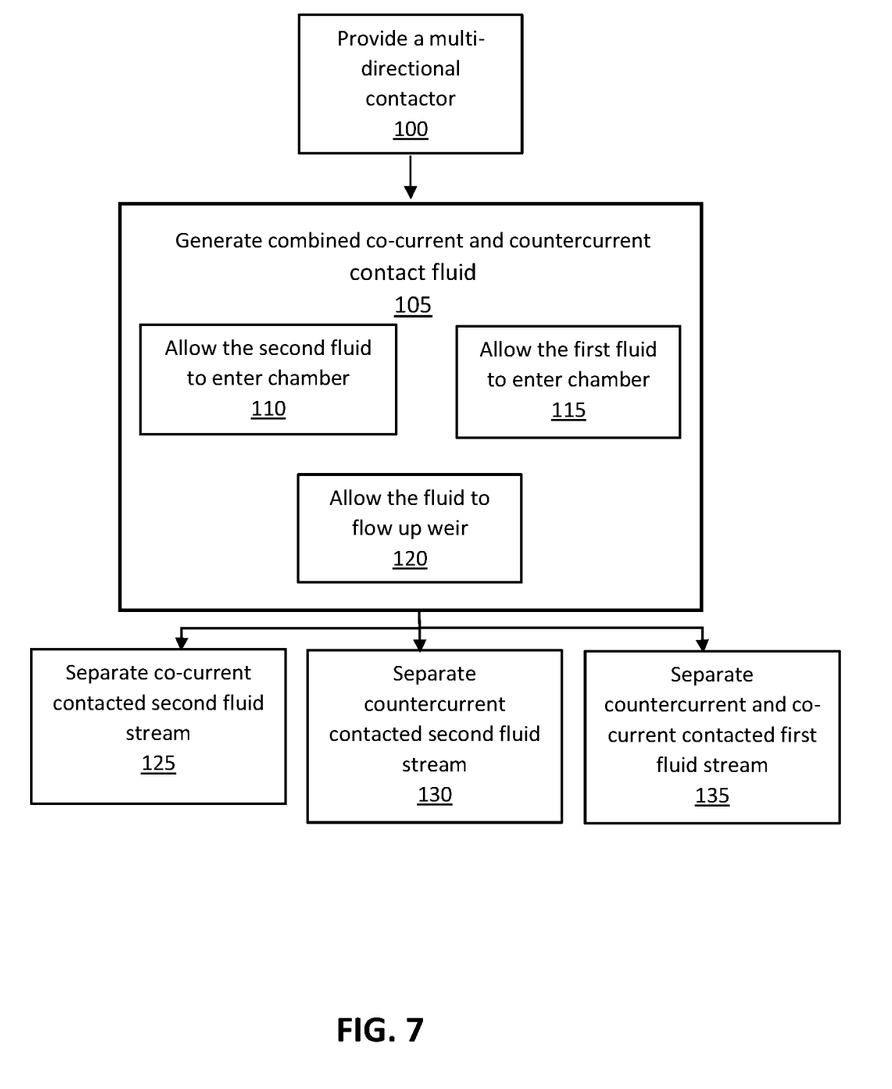
FIG. 7 is a flow diagram of an embodiment of a method of using the contactor according to this disclosure.
Figure 8:
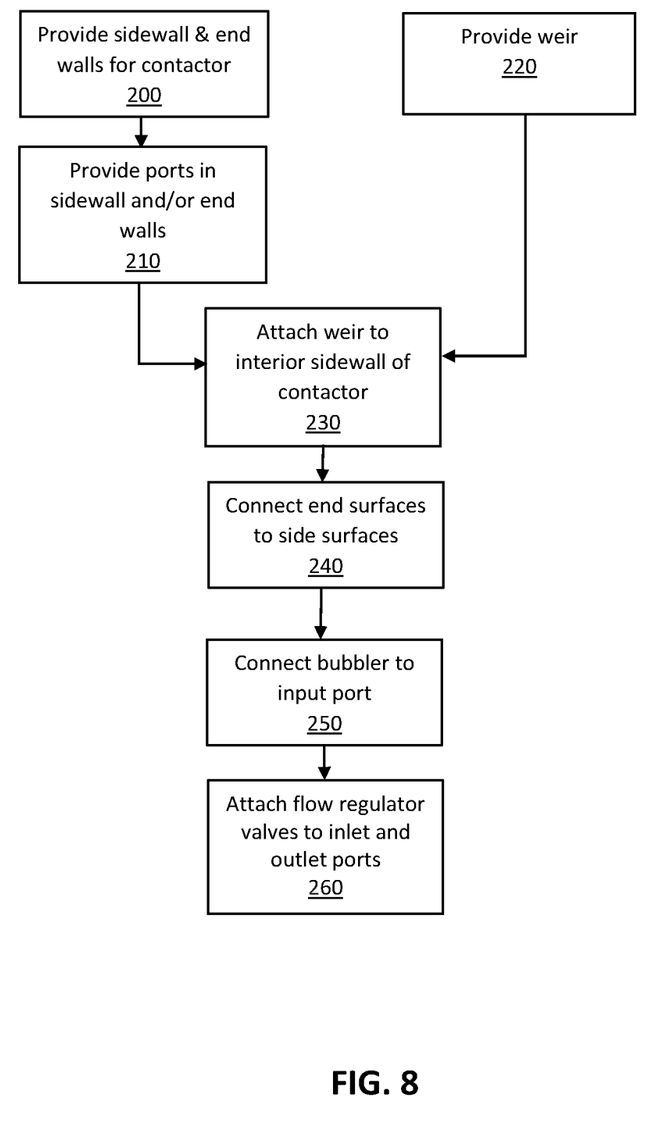
FIG. 8 is a flow diagram of an embodiment of a method of making the bidirectional contactor of FIG. 1A.

An embodiment of the invention including a method of contacting a first fluid 74 and a second fluid 72 having different densities and/or phases, wherein the first fluid 74 is relatively less dense than the second fluid 72, is depicted in FIG. 7. For example, the second fluid 72 may be a liquid and the first fluid may be a gas 74. However, it is understood that the first and second fluids 74,72 may be a variety of fluids having different densities. For example, the first and second fluids 74, 72 may both be liquids or a gases, and the first fluid 74 may be a vapor while the second fluid is a liquid 72, etc. Initially, a bi-directional contactor 50, according to the above description, is provided in step 100. The provided contactor 50 may, for example, comprise a chamber 40 enclosed by a chamber wall 10 having at least two inlet ports 1, 8, three outlet ports 2, 3, and 4, and a weir 20.

Step 105 includes providing a multi-directional contactor 50 according to one of the embodiments described above. The provided contactor 50 may include a single contact stage such as the first embodiment of the contactor 50 of FIG. 1 or multiple and differing contacting stages, such as the contactor 50 of FIG. 6. Step 105 also includes generating co-current and countercurrent contact within the provided contactor 50. The multi-directional or bi-directional contact may occur between a first fluid and a second fluid wherein the second fluid has a greater density than the first fluid.

In step 110, second fluid 72 is allowed to enter the chamber 40 through at least one second fluid inlet port 8 or via multiple second fluid inlet ports 8, 9 and 14. The second fluid 72 enters the chamber 40 with a first volumetric flowrate that is equal to the total volumetric flowrate of the second fluid entering the chamber 40 via all utilized second fluid inlet ports 8, 9 and/or 14.

In step 115, the first fluid 74 is allowed to enter, via inlet port 1, the chamber 40. A distribution element 15 may be utilized to assist in releasing the first fluid 74 across the width of the chamber 40.

As the second fluid 72 is denser than the first fluid 74, the second fluid 72 flows downwardly while the first fluid 74 flow upwardly. This generates countercurrent contact between the first and second fluids 74, 72 including countercurrent contact second fluid 73a and a countercurrent contacted first fluid 74a.

It is noted that the step of generating both co-current and countercurrent contact between the first and second fluids 74, 72 as provided in step 105, may further comprise allowing the second fluid 72 to flow into the chamber 40 at the first volumetric flow rate and releasing the countercurrent contacted second fluid 73b via the countercurrent contact outlet port 2 at a second volumetric flowrate. To generate both co-current and countercurrent contact flow, the second or effluent volumetric flowrate should be less than the first or influent flow rate. Otherwise, the contacted second fluid 73 will exit the chamber 40 without flowing over the weir 20.

As discussed above, the second fluid influent and effluent volumetric flow rates may be controlled, for example, by valves 68, 62, 63. For example, the second fluid influent volumetric flow rate may be controlled with valve 68 and the second fluid effluent volumetric flow rate may be controlled with valves 62 and 63. To ensure bi-directional flow occurs in the contactor 50, valve 62 should be set such that the second effluent volumetric flow rate is less than the second fluid influent volumetric flow rate which may be adjusted via valve 68.

Simultaneously, in step 120, the countercurrent contacted first and second fluids 74a and 73a become co-current contact flows by upwardly flowing against the weir 20. Therefore, co-current contacted second fluid 73a is formed as well as a co-current contacted first fluid 74b. It is noted that the development of co-current flow is not dependent on the countercurrent contact fluids 73a and 74a becoming co-current contact flows. Rather, the co-current contact flow may occur concurrently with the countercurrent flow. Thus, co-current contact second fluid 73b and co-current contact first fluid flow 74b may be generated independent of counter current contact flows 73a and 74a.

Step 125 includes separating the co-current contacted second fluid stream 44 from the combined co-current and countercurrent contact fluid by allowing a co-current contact second fluid 73b to flow over the weir 20 and out of the chamber 40 via co-current outlet port 3.

In step 130, the countercurrent contacted second fluid stream 42 is separated from the combined co-current and countercurrent contact fluid by releasing a countercurrent contact second fluid from the countercurrent outlet port 3.

In step 135, a co-current and countercurrent contacted first fluid stream 45 separated from the combined co-current and countercurrent contact fluid by releasing the upwardly flowing countercurrent contacted first fluid 74a and co-current contacted fluid 74b via the first fluid outlet port 4.

The first and second fluids may be a variety of different fluids, which may be immiscible, in various states that are contact for various reasons. For example, the first fluid 74 may include a gas, liquid and/or vapor, etc., and the first fluid may be chemically reacted and/or heat treated by the second fluid 72 which also be of various forms such as a gas or a liquid, even a solid (fluidized bed), etc. The first and second fluids 74, 72 may be placed in the contactor 50 for various processes such as thermal treatment, chemical reactivity (i.e. absorption, purification, reaction, etc) and/or mixing, etc. More specifically, the first fluid may be natural gas and/or acid gas containing hydrogen sulfide and the second fluid may be a liquid reducing reagent such as an iron chelating agent utilized for the removal of hydrogen sulfide from the natural gas. In this case, purified natural gas exits the chamber via port 4 and the spent or contacted liquid reagent 73 may exit the chamber through ports 2 and 3. Next, the contacted reagent 73 may be reactivated and returned to the contactor 50 via port 8 for reuse.

FIG. 7 depicts an embodiment of a method of making the bi-directional contactor 50. Initially, in step 200, the chamber wall 10, as described above, is formed. This may be done by separately forming the sidewall 11, bottom end wall 12 and top end wall 13. Sheet metal may be formed into the desired shapes using with techniques such as welding, bonding and metal working that are known to one of ordinary skill in the art. If there is a seam in the formation of the chamber wall 10, the seam may be made to be fluid impervious through techniques known to one of ordinary skill in the art and materials such as bonding, welding, adhesives, caulking, etc. Also, as discussed above, instead of sheet metal, other materials, including composites, plastic, metal alloys, metallic compounds, etc., 50 may be utilized. Additionally, if desired the side, bottom and end walls 11, 12, 13 may be made of different or the same materials.

In step 210, the relative inlet and outlet ports 1, 2, 3, 4, 8 are placed in the side wall 11 and end walls 12 and 13. At least two inlet ports 1, 8 may be placed in the sidewall 11. As discussed above, the two inlet ports are longitudinally spaced apart with the inlet 1 relatively lower than inlet 8. Outlet ports 4 and 2 may be placed in the end wall 13 and 12, respectively, or as discussed above ports 4 and 2 may be placed on appropriate portions of the sidewall 11. Outlet port 3 is placed on the portion of the sidewall 11 that will correspond section 25 created by the weir 20.

Step 220 involves forming the desired weir 20. The weir 20 may be formed of the same material or a different material as the walls 11,12 and 13. For example, the weir 20 may be formed of sheet metal formed using metal working, welding and or bonding, etc. As discussed above, the weir 20 may take different forms. For example, the weir 20 may be L-shaped or a single vertical plate. Regardless of the weir shape, the weir vertical height H2, when disposed in the chamber 40, must be shorter than the chamber vertical height H1. The difference in heights will allow the fluid inside the chamber 40 to flow over the weir edge 27. Further, the weir 20 is constructed such that it may be placed on the interior sidewall 11 or sidewall 11 and/or end wall 12 with a fluid tight seal.

Next, in step 230, the weir 20 is connected to the corresponding internal surface 14 of the chamber wall 10 such that port 3 will be within the section 25 created by the weir. As discussed above, the connection between the weir 20 and the internal surface 14 is a fluid tight or a fluid impervious connection allowing for the formation of section 25 within the chamber 40. The connection may be accomplished with the weir 20 directly connected to or abutting the interior sidewall surface 14 and through welding, bonding, adhesives, and/or caulking, etc.

In step 240, if desired, a diffuser or bubbler 15 placed inside the sidewall 11 and attached to desired inlet port 1.

In step 250, the end walls 12 and 13 are attached to the ends of the sidewall 11. It is noted that one end wall 12 or 13 maybe attached before the weir 20 is attached to the sidewall 11. Alternatively, both end walls 12 and 13 may be attached at this point. In either case, both end walls 12 and 13 are attached to the sidewall with a fluid impervious seal. This seal may be made through techniques and materials such as bonding, welding, adhesives, caulking, etc In step 260, flow regulating valves 61, 62, 63 and 68 may be placed on ports 1, 2, 3 and 8, respectively. Alternatively, the valves 61, 62, 63 and 68 may be placed on lines 46, 42, 44 and 47, respectively, which are attached to corresponding ports 1, 2, 3, and 8.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

The invention claimed is:

1. A contactor configured to contact a first fluid and a second fluid, wherein the second fluid includes a greater density than the first fluid, the contactor comprising:
   a tubular chamber defined by a chamber wall, the chamber extending vertically a first height;
   a first inlet port in the chamber wall, the first inlet port configured to allow the first fluid to enter the chamber;
   a second inlet port in the chamber wall, the second inlet port being above the first inlet port, and the second inlet port configured to allow the second fluid to enter the chamber;
   a first outlet port in the chamber wall, the first outlet port being above the first inlet port, and the first outlet port configured to allow a countercurrent and a co-current contacted first fluid to be released from the chamber;
   a second outlet port in the chamber wall, the second outlet port being below the second inlet port, and the second outlet port configured to release a first portion of contacted second fluid from the chamber, the first portion of contacted second fluid being a countercurrent contact stream;
   a third outlet port in the chamber wall, the third outlet port being laterally spaced apart from the second outlet port, and the third outlet port configured to release a second portion of the contacted second fluid from the chamber, the second portion of the contacted second fluid being a co-current contact stream; and
   a weir connected to an interior surface of the chamber wall, the weir extending vertically a second height which is less than the first height such that the weir partially divides the chamber into a first chamber section and a second chamber section, the first chamber section including the first inlet port and second outlet port for releasing the countercurrent contact stream and the second chamber section including the third outlet port for releasing the co-current contact stream,
   wherein the first inlet port is positioned in the chamber wall across from the weir and within the second height of the weir.

2. The contactor of claim 1, wherein the second outlet port is configured with an effluent flow rate, the second inlet port is configured with an influent flow rate and the effluent flow rate is less than the influent flow rate.

3. The contactor of claim 1, wherein the weir further comprises:
   a first weir surface opposite a second weir surface, the first weir surface facing the second outlet port, the first inlet port and a first portion of the chamber wall; and
   a second weir surface facing a second portion of the chamber wall and the third outlet port positioned in the second portion of the chamber wall.

4. The contactor of claim 1, wherein the weir further comprises an impervious barrier between the first and second chamber sections.

5. The contactor of claim 1, further comprising:
   a distribution element connected to the first inlet port, the distribution element extending laterally from the first inlet port towards the weir, and the distribution element configured to release the first fluid within the chamber.

6. The contactor of claim 1, wherein the weir further comprises:
   a substantially vertically extending plate including a first end and a second end extending between two sides, the second end and two sides connected to the interior surface of the chamber such that the first end is relatively higher than the second end,
   wherein the first end is configured to allow the contacted second fluid to flow over the weir.

7. The contactor of claim 1, wherein the first chamber section is configured to allow simultaneous countercurrent and co-current contact between the first fluid and second fluid, the first portion of the contacted second fluid released by the second outlet port results from countercurrent contact flow between the first and second fluids, and the contacted second fluid released from the third outlet port results from co-current flow of the second and first fluids and the second fluid flowing over the weir.

8. The contactor of claim 1, wherein the first chamber section is configured to allow the first fluid to flow in a first direction, which is substantially upwardly, between the first inlet port and first outlet port, and the first chamber section is configured to allow the second fluid to flow in a second direction, which is substantially downwardly, between the second inlet port and the second outlet port, and the chamber is configured to simultaneously allow the second fluid to flow in the first direction and second direction as the second fluid flows from the second inlet port, over the weir and is released from the third outlet port.

9. The contactor of claim 1, wherein the first and second fluids comprise a gas, liquid, solid, vapor or combination thereof.

10. The contactor of claim 1, further comprising:
    a co-current contact section within the chamber, the co-current contact section disposed above the weir.

11. A method of making a co-current and countercurrent contactor configured to contact a first fluid and a second fluid, wherein the second fluid has a greater density than the first fluid, the method comprising:
    forming a chamber enclosed by a chamber wall, the chamber wall including an interior surface defining the chamber, and the chamber extending vertically a first height;
    forming a first inlet port in the chamber wall, the first inlet port configured to allow the first fluid to enter the chamber;

forming a second inlet port in the chamber wall, the second inlet port being above the first inlet port, and the second inlet port configured to allow the second fluid to enter the chamber;

forming a first outlet port in the chamber wall, the first outlet port being above the first inlet port, and the first outlet port configured to allow a countercurrent and co-current contacted first fluid to be released from the chamber;

forming a second outlet port in the chamber wall, the second outlet port being below the second inlet port, and the second outlet port configured to release a first portion of contacted second fluid from the chamber, the first portion of contacted second fluid being a countercurrent contact stream;

placing a weir in the chamber such that the weir extends vertically a second height which is less than the first height, the first inlet port is across from the weir and the first inlet port is within the height of the weir, and the weir partially divides the chamber into a first chamber section and a second chamber section, the first chamber section including the first inlet port and second outlet port for releasing the countercurrent contact stream; and forming a third outlet port in the chamber wall within the second height of the weir and the second chamber section such that the third outlet port is laterally spaced apart from the second outlet port, and the third outlet port is configured to release a second portion of the contacted second fluid from the chamber, the second portion of contacted second liquid being a co-current contact stream.

12. The method of claim 11, wherein placing the weir in the chamber further comprises:

connecting the weir to an interior surface of the chamber wall such that the weir abuts the interior surface of the chamber wall between the second outlet port and the third outlet port, and a second end of the weir is lower than a first end of the weir.

13. The method of claim 11, wherein placing the weir in the chamber further comprises:

placing the weir in the chamber such that a first surface of the weir faces the first inlet port and the second outlet port, and a second surface of the weir faces the third outlet port; and forming a fluid impervious barrier where the weir abuts the interior surface of the chamber wall.

14. A method of co-current and countercurrent contacting of a first fluid with a second fluid, wherein the second fluid includes a greater density than the first fluid, the method comprising:

generating a combined co-current and countercurrent contact fluid in a chamber, the combined co-current and countercurrent contact fluid including contacted first and second fluids, comprising concurrently delivering the first and second fluids into a chamber;

generating countercurrent contact between the first and second fluids by allowing the first fluid to flow into the chamber through a first inlet port in a chamber wall and flow upwardly within the chamber, and allowing the second fluid to flow into the chamber through a second inlet port positioned in the chamber wall, the second inlet port being above the first inlet port and allowing the second fluid to flow downwardly contacting the upwardly flowing first fluid, and generating co-current contact between the first and second fluids by allowing the first and second fluids to contact while flowing upwardly against a weir extending vertically within the chamber.

15. The method of claim 14, further comprising:

separating a co-current contacted second fluid stream from the combined co-current and countercurrent contact fluid by allowing a co-current portion of the combined co-current and countercurrent contact fluid to flow over the weir and out of the chamber via a co-current outlet port.

16. The method of claim 14, further comprising:

separating a co-current and countercurrent contacted first fluid stream from the combined co-current and countercurrent contact fluid by releasing the upwardly flowing contacted first fluid from a first fluid outlet port positioned on a portion of the chamber wall above the first inlet port.

17. The method of claim 14, wherein the first and second fluids comprise a gas, liquid, solid, vapor or combination thereof.

18. The method of claim 14, wherein generating countercurrent contact between the first and second fluids further comprises allowing the second fluid flow into the chamber through the second inlet port at a first flow rate, and further comprising:

releasing the countercurrent contacted second fluid via a countercurrent contact outlet port at a second flowrate which is less than the first flowrate.

19. The method of claim 14, further comprising:

generating countercurrent and co-current contact between the first and second fluids in a first section of the chamber, the first section of the chamber being laterally adjacent the weir.

* * * * *